United States Patent [19]
Cullen

[11] Patent Number: 5,460,536
[45] Date of Patent: Oct. 24, 1995

[54] REPLACEABLE HIGH POWER ELECTRICAL CONTACTS FOR ROBOTIC TOOL CHANGING SYSTEMS

[75] Inventor: W. Paul Cullen, Scotia, N.Y.

[73] Assignee: Applied Robotics, Inc., Glenville, N.Y.

[21] Appl. No.: 276,197

[22] Filed: Jul. 18, 1994

[51] Int. Cl.$^6$ ................................................ H01R 23/27
[52] U.S. Cl. .......................... 439/289; 439/626; 901/29; 483/901
[58] Field of Search .................................. 439/709, 810, 439/577, 894, 626, 289; 483/901; 901/29

[56] References Cited

U.S. PATENT DOCUMENTS

| | | | |
|---|---|---|---|
| 4,635,328 | 1/1987 | Palmer | 483/901 |
| 4,664,588 | 5/1987 | Newell | 414/730 |
| 5,368,506 | 11/1994 | Heimbrock | 439/709 |

OTHER PUBLICATIONS

Applied Robotics Omega III XChange product literature, AR180–Jun. 1992.
Applied Robotics Omega III Transgun product literature, AR04–May 1991.
Applied Robotics Omega III XChange product literature, AR06–Mar. 1989.

*Primary Examiner*—Gary F. Paumen
*Attorney, Agent, or Firm*—Heslin & Rothenberg

[57] ABSTRACT

A high power electrical interface unit for a robotic tool changing system has a housing, a high power electrical connector in the housing for attachment to a high power electrical cable, and a replaceable high power electrical contact removably attachable to the electrical connector. The electrical contact extends into an opening in the housing and may be replaced through the opening without other disassembly of the interface unit. The contact may be threadably attachable to the connector, and the interface unit may include a member for preventing the electrical connector from rotating when the contact is threaded to the connector. The contact may include a head portion having a spheroidal or spherical contact surface, and a side surface configured for ready engagement by a hand tool such as a socket wrench. The interface unit may be removably secured to either a robot or tooling adaptor, or the interface unit may be integral to the robot or tool adaptor.

22 Claims, 6 Drawing Sheets

REPLACEABLE HIGH POWER ELECTRICAL CONTACTS FOR ROBOTIC TOOL CHANGING SYSTEMS

BACKGROUND OF THE INVENTION

1. Technical Field

The present invention generally relates to high power interface units for robotic tool changing systems. More particularly, the present invention relates to replaceable high power electrical contacts for robotic tool changing systems.

2. Background Information

Over the past several decades, reliance on robot technology has increased significantly. While at one time the highest concentration of robot use was in the areas of electronic machinery manufacturing and automobile manufacturing, the application of robot technology now includes other diverse areas such as nuclear power generation, offshore development, disaster prevention, and other areas in which remote-controlled robot systems perform their functions quickly and accurately under difficult or dangerous conditions. More specifically, robots are now used for such diverse functions as finishing concrete, painting tall buildings, and even performing medical care. The economic and social role of robots is likely to continue to expand in the future, as advancements in robot technology make possible wider commercial application and greater improvements in industrial productivity and product quality.

Notwithstanding the expansion to other fields, robot technology remains significant in industrial applications, such as automotive manufacturing. For instance, robots continue to play a major role in automotive spot welding applications. In spot welding applications, a portable spot welding gun is installed on or attached to a robot, which is then programmed to position the gun to the desired location and produce spot welds automatically, without the need for an operator. Robots spot weld with uniformity of spot location and weld integrity.

Robotic tool changing systems permit a robot to perform various different tasks. For instance, a robotic tool changing system may enable a single robot to perform spot welding, palletize heavy loads, and engage in rigorous metal removal operations. The tool changing system allows for automatic exchange of tools as required for different jobs. A robotic tool changing system is made up primarily of two assemblies, a robot adaptor and a tooling adaptor. The robot adaptor is connected to the robot while the tooling adaptor is connected to the tool. When they are coupled together, the robot adaptor and tooling adaptor form the mechanical connection and signal interface (electrical, pneumatic, etc.), which permits the robot to perform a particular task.

Robotic tool changing systems incorporate high power electrical interface units for the transfer of high electrical energy needed for certain applications. These electrical interface units may be integral with the robot and tooling adaptor units, or they may be removably attached to the adaptor units. Robotic spot welding is one example of a robotic application which requires the transfer of high electrical power. Usage of high power electrical interface units permits the flow of high power needed for applications such as arc welding; resistance welding applications, including spot welding (both transgun and remote transformer operations), aluminum resistance welding, and stud welding; and various resistance heating applications. High power requirements typically exceed 10,000 Watts, and the following chart summarizes power requirements for some specific applications:

| APPLICATION | VOLTAGE (V) | AMPERAGE (i) | POWER (KW) |
|---|---|---|---|
| Arc Welding | 80 V | 150 i | 12 KW |
| Transgun Spot Welding | 460 | 100–200 | 46–92 |
| Remote Transformer Spot Welding | 460 | 26,000 | 11,960 |
| Stud Welding | 460 | 200–300 | 92–138 |
| Aluminum Resistance Welding | 680 | 800 | 544 |
| Resistance Heating | 110–460 | 10–1,000 | 1.1–4.6 |

In order to achieve the high power electrical transfer for a high power robotic application such as spot welding, high power electrical contacts are integrated into the high power electrical interface units. Typically, each interface unit contains multiple electrical contacts extending into openings within an electrically insulating housing. During operation, the high power electrical interface units of the robot and tooling adapters are mated together so that their sets of contacts align and abut. Since the electrical contacts are electrically and mechanically contiguous with a heavy duty electrical cable, the transfer of high power may be realized.

Although the high power electrical contacts in the robot and tooling adapters are protected by a housing, they have a limited life cycle. Under circumstances where there is no contamination of the contacts, an average life cycle of an electrical contact is about one million cycles. The contact must then be replaced. During normal usage, however, the high power electrical contacts are subject to a number of environmental contaminants, which may drastically shorten their life cycle. For example, the high power electrical contacts may be exposed to dirt, dust, grease, water and other foreign contaminants. In spot welding operations, the high power electrical contacts are also subject to welding slag. Welding slag is molten metal that is created in the spot welding process. In the molten state, welding slag may bond to the high power electrical contacts contained in the multi-contact electrically insulating housing. In this situation, the welding slag may then solidify or become welded onto the high power electrical contacts. The molten welding slag may also solidify in mid-air, thereafter landing on the high power electrical contacts in a hardened state.

When the robot adaptor and tooling adaptor are mated so that electrical contact is made, the welding slag contamination on the contacts may cause the electrical contacts to arc, pit and/or corrode. More specifically, once welding slag adheres to an electrical contact and the contaminated contact is mated to another contact, all the current passing through the contact connection tends to divert through the hardened and attached welding slag. When such a concentration of high power occurs across the welding slag, the electrical contact may arc and become pitted. This pitting and arcing, in turn, may generate an electrical short across the mated electrical contacts.

Once an electrical contact becomes contaminated and damaged, the contact must be replaced. Presently, replacement of a contaminated electrical contact involves disassembly of the entire high power electrical interface unit and disconnection of the electrical cables, removal and replacement of the whole high power electrical contact assembly, cable re-connection and unit reassembly. Replacement, therefore, is a time-consuming, labor intensive, tedious and expensive process. Due to the labor intensive nature of replacement, there is the further possibility that the interface units and/or electrical contacts will become damaged by human error.

Thus, a need exists for an interface unit of a robotic tool changing system which provides simple and easy replacement of high power electrical contacts thereof, without the difficulty of disassembly and re-assembly of the interface units which house the contacts.

SUMMARY OF THE INVENTION

Briefly, the present invention satisfies this need and overcomes the shortcomings of the prior art through the provision of a high power electrical interface unit for a robotic tool changing system which includes a housing, a high power electrical connector in the housing for attachment to a high power electrical cable, and a replaceable high power electrical contact removably attachable to the electrical connector. The electrical contact extends into an opening in the housing and is replaceable through the opening without other disassembly of the interface unit.

Preferably, the contact is threadably attachable to the connector, and the interface unit further includes means for preventing the electrical connector from rotating when the contact is threaded to the connector. The contact may include a head portion having a spherical or spheroidal contact surface, and a side surface configured for ready engagement by a hand tool such as a socket wrench.

Typically, an interface unit includes several contacts removably attachable to corresponding connectors housed within the housing. Each contact extends into a respective housing opening and is replaceable therethrough. Axially aligned contacts in two interface units abut to facilitate high power electrical transfer from the robot to the tool for high power applications such as spot welding.

It is therefore, an object of this invention to provide an improved robotic tool changing system.

It is another object of this invention to provide an improved high power electrical interface unit for a robotic tool changing system.

It is a further object of this invention to provide an improved high power electrical interface unit for a robotic tool changing system having an easily replaceable high power electrical contact.

It is yet another object of this invention to provide an easily replaceable high power electrical contact which simplifies maintenance for a robotic tool changing system.

It is a further object of this invention to provide an easily replaceable high power electrical contact which reduces the cost of replacing contaminated and damaged high power electrical contacts.

These, and other objects, features and advantages of this invention will become apparent from the following detailed description of the preferred embodiment of the invention taken in conjunction with the accompanying drawings.

DETAILED DESCRIPTION

Figure 1:
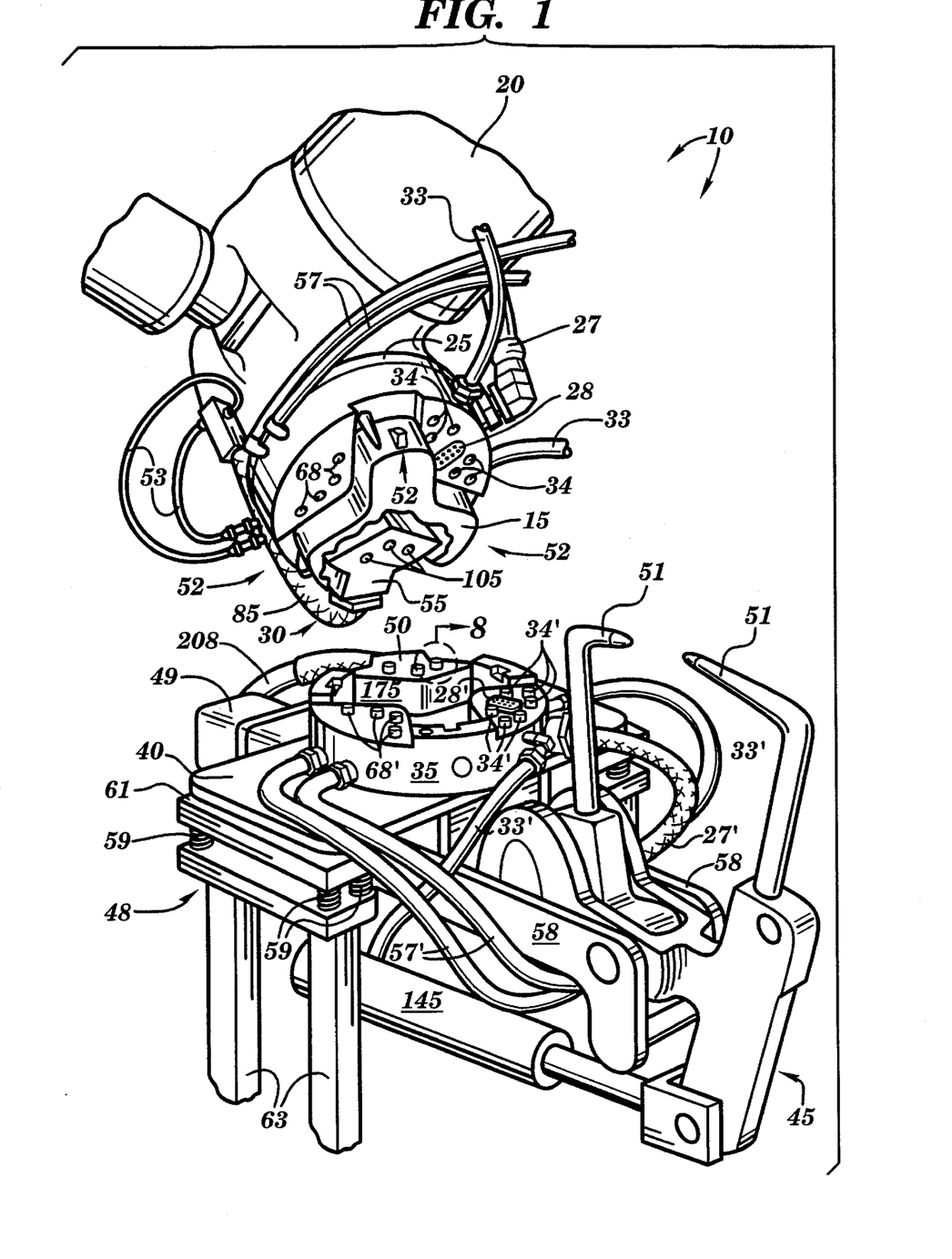
FIG. 1 is a perspective, partially cut-away view of the robotic tool changing system of the present invention employed in conjunction with a robotic spot welding tool.

Referring now to the drawings, and more particularly to FIG. 1, a robotic tool changing system 10 of the present invention is shown. The robotic tool changing system includes a robot adaptor 15 and a complimentary, automatically couplable, tooling adaptor 35. Robot adaptor 15 is mechanically secured to a robot arm 20 of a robot by a robot adaptor plate 25. Robot adaptor 15 includes a first high power electrical interface unit 30 removably attached thereto. While interface unit 30 is shown as a separable module, it may, alternatively, be integral to robot adaptor 15.

Similarly, tooling adaptor 35 is mechanically secured by a tooling adaptor plate 40 to a tool. In FIG. 1, the tool is a spot welding gun 45. Spot welding gun 45 has jaws 51, which open and close, for producing spot welds. A second high power electrical interface unit 50 is removably attached to tooling adaptor 35. Like first interface unit 30, second interface unit 50 is shown as a separable module of its adaptor 35, but may be structurally integral to tooling adaptor 35.

Tooling adaptor plate 40 provides the means for attaching tooling adaptor 35 to spot welding gun 45. Spot welding gun 45 is mechanically secured to the bottom of tooling adaptor plate 40 by a plurality of arms 58 on spot welding gun 45. A transformer 49 for spot welding gun 45 may also be attached to tooling adaptor plate 40.

Tooling adaptor plate 40, tooling adaptor 35, welding gun 45, and transformer 49 are all set on top of a support fixture 48. Support fixture 48 includes a flat substantially U-shaped plate 61 mounted via coil springs 59 atop a plurality of legs 63. Tooling adaptor plate 40 is rectangularly shaped and sized to overlie plate 61 of support fixture 48. Since arms 58 of spot welding gun 45 attach to the bottom of tooling adaptor plate 40, the U-shaped configuration of plate 61 of support fixture 48 allows spot welding gun 45 to be lifted upwards off of support fixture 48 during operation. The shape of adaptor plate 40 may vary, depending on the specific robotic application. Because it is difficult to attain repeated preciseness and exactness in the alignment of mating robot adaptor 35 with tooling adaptor 15, coil springs 59 are employed in support fixture 48 to provide a certain amount of "play" during mating of the adapters so that any misalignment of the adapters may be offset.

As is known in the art, various connectors and cables extend from both robot adaptor 15 and tooling adaptor 35. A triple-cam latching mechanism 52 locks tooling adaptor 35 to robot adaptor 15. During operation, the engaged latching mechanism 52 provides a payload capacity exceeding the payload requirements of most robots. Pneumatic coupling lines 53 provide a flow of air for the operation of cylinders (not shown) in robot adaptor 15 for the coupling and uncoupling of latching mechanism 52.

Robotic tool changing system 10 may also incorporate electrical, pneumatic, and other interface connections necessary for various applications. For instance, a plurality of coolant fluid lines 57 provide a flow of fluid coolant, preferably water, to and from robot adaptor 15 of robotic tool changing system 10. Ports 68 and 68', on robot adaptor 15 and tooling adaptor 35, respectively, provide for passage of the fluid coolant between robot adaptor 15 to tooling adaptor 35. Corresponding coolant fluid lines 57' are attached and extend from tooling adaptor 35 allowing coolant fluid to circulate to spot welding gun 45, transformer 49, and jaws 51. Electrical cable assembly 27 provides input/output control signal connection to robot adaptor 15. During the mating of the adapters, electrical pins 28 of robot adaptor 15 connect to corresponding electrical pins 28' on tooling adaptor 35 facilitating electrical control signal transfer between the adapters. Electrical cable assembly 27' provides central signal interconnection between tooling adaptor 35 and spot welding gun 45. Pneumatic lines 33 extending from robot adaptor 15 are employed to furnish air throughout the tool changing system into an air cylinder 145 of spot welding gun 45 so that jaws 51 may be opened and closed. Interface ports 34 on robot adaptor 15 and corresponding ports 34' on tooling adaptor 35 provide for passage of air from pneumatic lines 33 of robot adaptor 15 through to tooling adaptor 35, and out pneumatic lines 33' of tooling adaptor 35 and into air cylinder 145 of spot welding gun 45.

For greater detail on the interconnections and operation of a robotic tool changing system, the reader is referred to U.S. Pat. No. 4,664,588, issued to Newell et al., commonly owned by the assignee of the present invention, Applied Robotics, Inc., entitled APPARATUS AND METHOD FOR CONNECTING AND EXCHANGING REMOTE MANIPULABLE ELEMENTS TO A CENTRAL CONTROL SOURCE, the disclosure of which is hereby incorporated by reference in its entirety. More specifically, for more detail on a robotic tool changing system for spot welding applications, the reader is referred to product literature AR180—6/92, of Applied Robotics, Inc., 301 Nott Street, Schenectady, N.Y. 12305, for its Omega III XChange transgun system, the disclosure of which is hereby incorporated by reference in its entirety.

Figure 2:
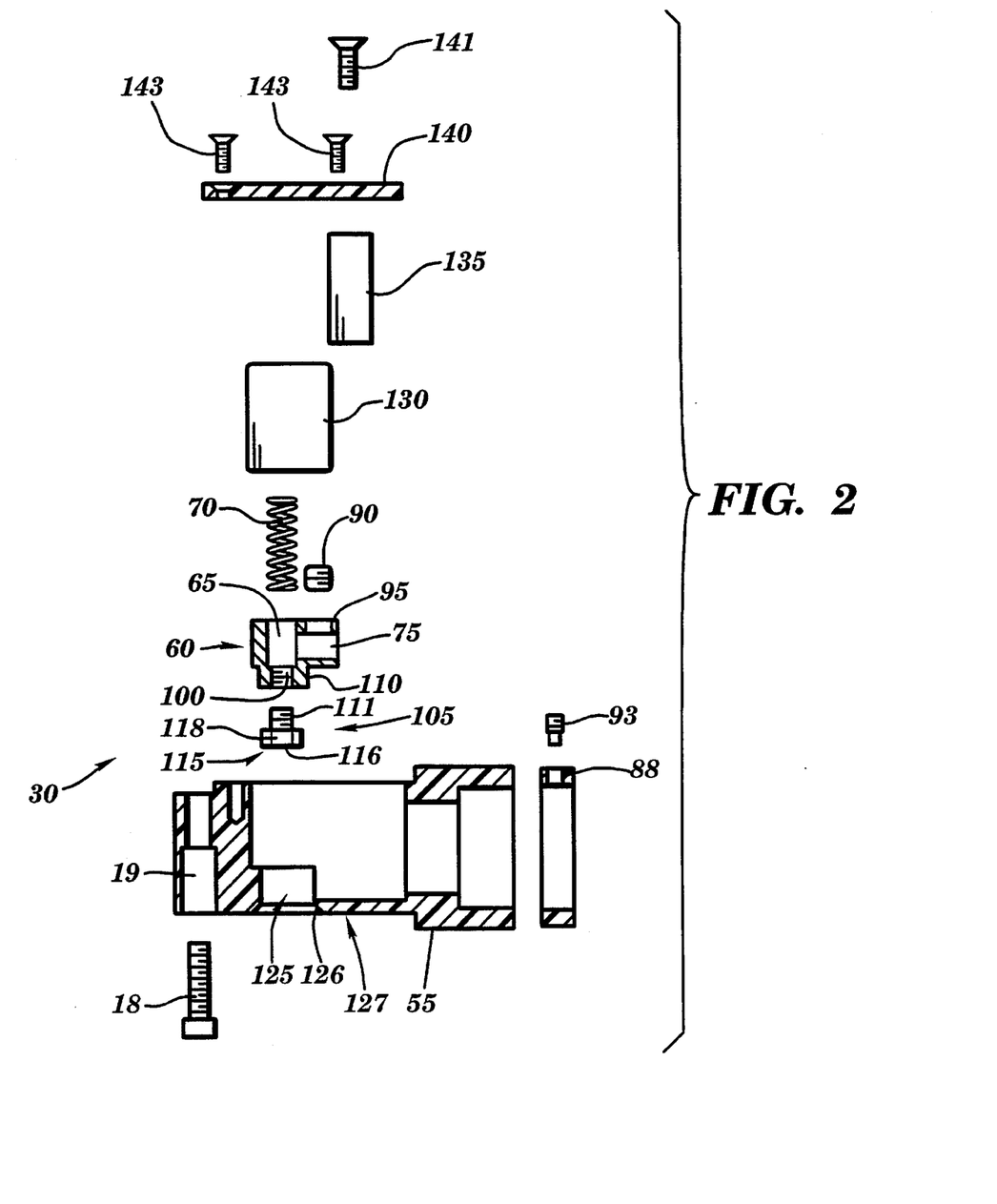
FIG. 2 is an exploded side sectional view of a first high power electrical interface unit of the present invention.
Figure 3A:
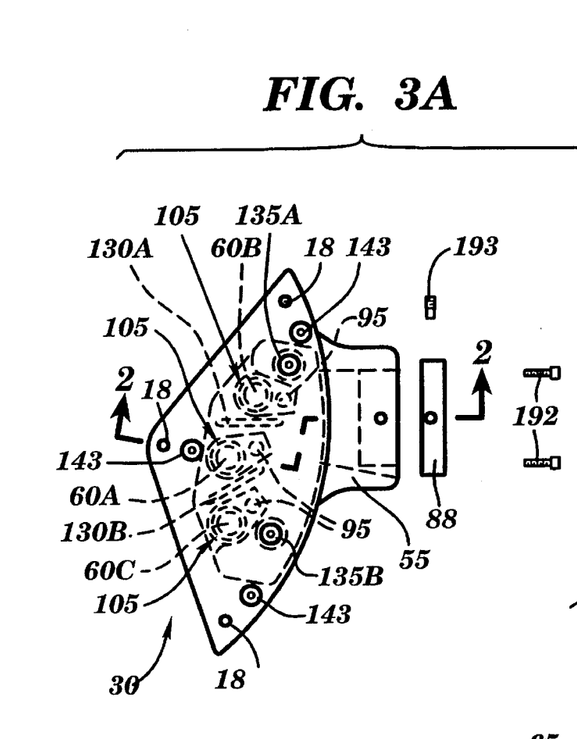
FIG. 3A is a top plan view, partially in phantom, of the high power electrical interface unit of FIG. 2.
Figure 3B:
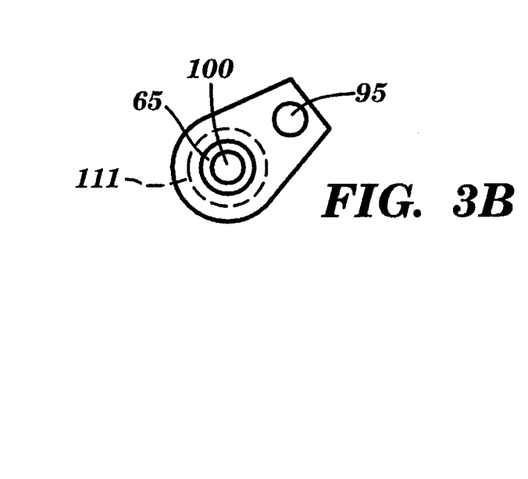
FIG. 3B is a blown-up top view of an individual first high power electrical connector.
Figure 4:
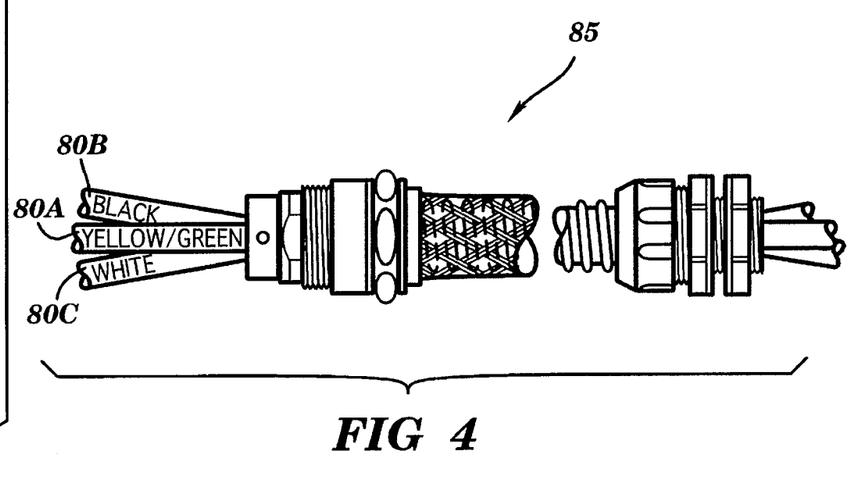
FIG. 4 is a side view of a high power cable and accompanying cable assembly for the high power electrical interface unit of FIGS. 2 and 3.

A preferred embodiment of the improved high power interface units for robotic tool changing systems of the present invention will now be described. Referring now to FIGS. 2–4, first high power electrical interface unit 30 of robot adaptor 15 is shown in greater detail. Interface unit 30 is, preferably, removably attachable to robot adaptor 15. Interface unit 30 is attachable to robot adaptor 15, for instance, with screws 18 seated in opening 19 of an interface unit housing 55. Housing 55 of interface unit 30 surrounds and provides structural integrity for the various elements which are housed therein. Preferably housing 55 is fabricated from an insulating material. Glass filled epoxy is a preferred insulating material for housing 55 because of its excellent insulating quality and its ability to withstand the contamination of hot welding slag. However, other suitable materials may be chosen for housing 55, so long as the material chosen provides electrical insulation between the electrically conductive elements situated therein. If desired, a light weight metal may be selected for housing 55, so long as insulating sheaths are placed around the conductive elements contained in the housing. Housing 55 may have a pie-slice configuration as shown in FIG. 3A, or other shapes may be chosen.

Inside housing 55 are a plurality of first high power electrical connectors 60. In FIG. 3A, three such high power electrical connectors 60A, 60B, and 60C are shown. For purposes of simplicity, these connectors will sometimes be discussed generally herein in the singular, as connector 60, i.e., without a letter designation. Each connector 60 is preferably cam-shaped as viewed from the top in FIGS. 3A and 3B, and made of a highly conductive material so that a high current may flow therethrough. For example, silver plated welding copper, or RWMA class two copper alloy, is a suitable conductive material for connector 60. Electrical connector 60 has a bore 65 to receive a helical coil spring 70 (FIG. 2). Spring 70 serves to spring load connector 60 towards and partially into an opening 125 in housing 55. Housing 55 includes a contact face 127 for opening 125.

A cavity 75 is formed on one side of electrical connector 60. Cavity 75 receives a high power electrical cable wire 80 (FIG. 3A). As shown in FIGS. 3A and 4, the three high power electrical connectors 60A, 60B and 60C attach to three cable wires 80A, 80B, and 80C, respectively, namely a ground wire, or one of two current wires. A first cable assembly 85 houses the three cable wires 80A, 80B, and 80C. Each cable wire 80 may be removably attached to its corresponding high power electrical connector 60 by a set screw 90 (FIG. 2), which is threaded to a threaded hole 95 provided through the wall which forms cavity 75. After cable wire 80 is placed inside of cavity 75 of connector 60, set screw 90 may be threaded to threaded hole 95 to press against and thus fasten cable wire 80 within cavity 75. First cable assembly 85 and wires 80 housed therein are connected at their other end to a high energy power source (not shown).

Referring again to FIG. 2, a cylindrical portion 110 forms the bottom of high power electrical connector 60. As shown in FIG. 2, the outer surface of cylindrical portion 110 does not extend to the outermost edge of the cam-shaped portion of electrical connector 60. Rather, the outer surface of cylindrical portion 110 forms a cylinder, sized for insertion into a cylindrically shaped opening 125 of housing 55. The diameter of cylindrically shaped opening 125 is sized slightly larger than the diameter of cylindrical portion 110 so that cylindrical portion 110 of connector 60 may fit comfortably inside opening 125. Cylindrical portion 110 is hollow, having an internally threaded hole 100 passing axially therethrough. Threaded hole 100 of connector 60 removably receives a first replaceable high power electrical contact 105.

Like first high power electrical connector 60, first replaceable high power electrical contact 105 is made of a conductive material so that electrical current may pass therethrough. Preferably, the identical material selected for connector 60 is desirable for contact 105. Silver plated welding copper, or RWMA class two copper alloy, is therefore suggested.

As shown in FIG. 2, one end of electrical contact 105 may comprise a threaded stem 111 and the other end may comprise a head portion 115. Threaded hole 100 of connector 60 threadably receives threaded stem 111 of electrical contact 105. Head portion 115 has a contact surface 116, which preferably is spherical (FIG. 9) or spheroidal (FIG. 10) in shape, the significance of which will later become evident. Furthermore, head portion 115 has a side surface 118 extending from contact surface 116 towards threaded stem 111. In the preferred embodiment, side surface 118 is multi-faceted, so that head portion 115, in cross-section, forms a hexagonal configuration. This hexagonal configuration facilitates ready engagement by a common hand tool, e.g. a socket wrench (not shown), for the simple removal and attachment of electrical contact 105 to connector 60 through opening 125 in housing 55. Other shapes for head portion 115, which are easily adaptable for other hand tools, may also be selected. Head portion 115 has a cross section smaller than that of opening 125 so that contact 105 can be replaced through opening 125 without other disassembly of interface unit 30. Opening 125 is preferably flared, as shown at 126 to facilitate such replacement.

While in the preferred embodiment, electrical contact 105 is depicted as threadably attachable to electrical connector 60, it should be understood that electrical connector 60 and contact 105 may be attached to one another by other mechanical means, for example, by a friction fit, or by a non-permanent chemical means, such as silver epoxy. Where a chemical means of attachment is used to connect connector 60 and contact 105, a contaminated contact may be replaced by breaking the chemical bonding seal.

Preferably, opening 125 of housing 55 is sufficiently deep so that when electrical contact 105 is threaded to electrical connector 60 through opening 125, head portion 115 of electrical contact 105 does not protrude beyond opening 125. Rather, head portion 115 of electrical contact 105 is recessed inside opening 125. This arrangement is preferable for a variety of reasons, the most significant of which is to provide a safe environment for the robotic tool changing system 10. Since cable assembly 85 is attached to a high power electrical source (not shown), current will pass through electrical connector 60 and electrical contact 105 when the system is energized. Therefore, in order to avert a person from touching head portion 115 of electrical contact 105, either accidentally or intentionally, electrical contact 105 is recessed inside opening 125.

In the preferred embodiment, there are three electrical connectors 60A, 60B, and 60C situated inside of housing 55 of high power electrical interface unit 30. Each one of connectors 60A, 60B, and 60C is seated in and rotatable within a respective opening 125 in housing 55, and this rotation may result in two adjacently positioned connectors to make contact. For instance, the rotation of connector 60A may result in contact with connector 60B or connector 60C. Such contact is not desirable since it may result in electrical failure of the robotic system. The rotation of an electrical connector 60 is most likely to occur while contact 105 is threaded to (i.e. in or out of) aperture 100, since the rotational torque associated with such threading will tend to rotate connector 60. The rotation of connector 60, which is attached to corresponding electrical wire 80, may also cause attached wire 80 to become loose or dislodged. Therefore, it is most desirable to provide a rotation preventing means for each connector 60. In order to prevent adjacent electrical connectors from rotating into contact within housing 55, non-conductive plate 130A is placed between adjacent connectors 60A and 60B, and plate 130B is placed between connectors 60A and 60C, as best seen in FIG. 3A. In order to secure plates 130A and 130B inside interface unit 30, they may be placed in corresponding grooves (not shown) formed in housing 55 and secured therein with an adhesive. Alternatively, plates 130 may be integrally formed with housing 55.

Electrical connector 60 may rotate in one of two directions: clockwise or counter-clockwise. As stated previously, this rotation is most likely to occur when electrical contact 105 is either threadably inserted into or threadably removed from electrical connector 60. While plates 130A and 130B prevent each electrical connector 60 from further rotating in a direction towards positioned plates 130A and 130B, these plates will not prevent electrical connector 60 from rotating in a direction where no such anti-rotation plate is positioned. Therefore, the preferred embodiment includes a second anti-rotation means to prevent such rotation, through the provision of elongated pins 135A and 135B. Elongated pins 135A and 135B are secured to a cover 140 of housing 55 by screws 141. Pins 135A and 135B are preferably circular in cross-section and made of an insulating material. When cover 140 is attached to housing 55, elongated pin 135A will rest next to electrical connector 60B and elongated pin 135B will rest next to connector 60C, as shown in FIG. 3A.

Assembly of interface unit 30 is complete when cover 140 is attached to housing 55, preferably by mechanical means, such as screws 143. In the preferred embodiment, there are three associated sets of first electrical connectors 60 and electrical contacts 105. Each electrical connector 60 is provided with a corresponding helical coil spring 70, which sits in a corresponding bore 65. When cover 140 is fastened to housing 55, coil spring 70 forces electrical connector 60, along with attached contact 105 downward in opening 125. This spring arrangement causes associated electrical connector 60 and contact 105 to be spring loaded, the importance of which will later become evident.

Figure 5A:
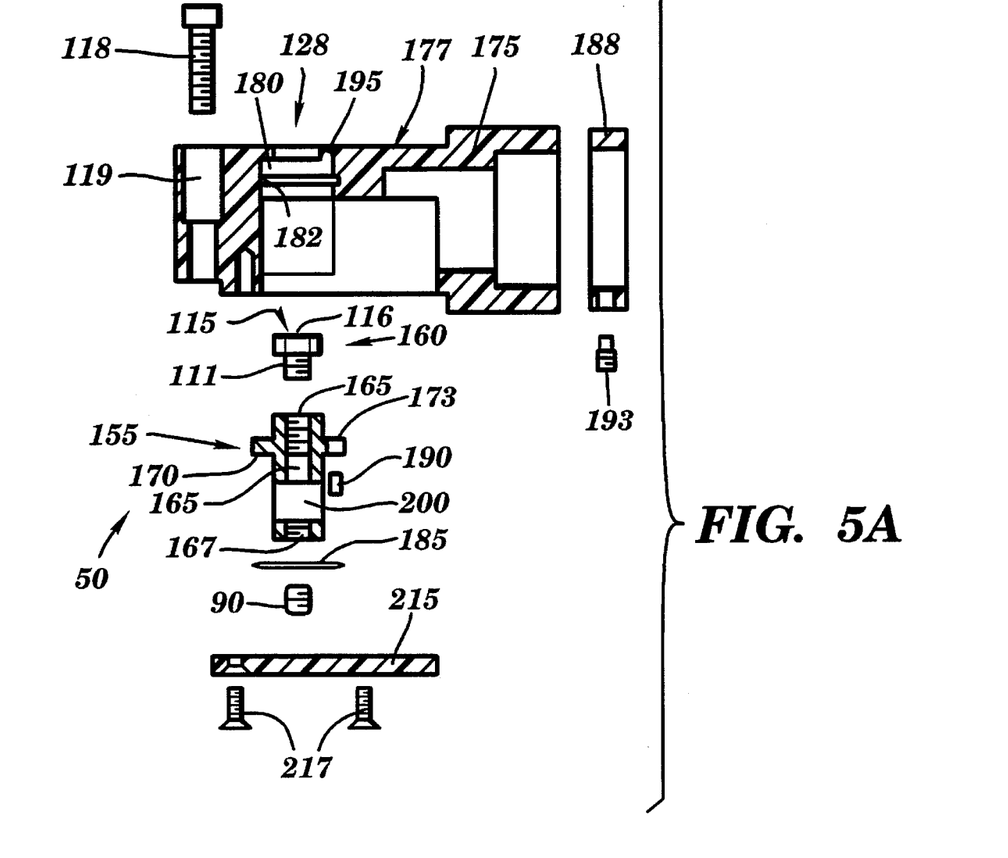
FIGS. 5A and 5B is an exploded side sectional view of a second high power electrical interface unit of the present invention.
Figure 5B:
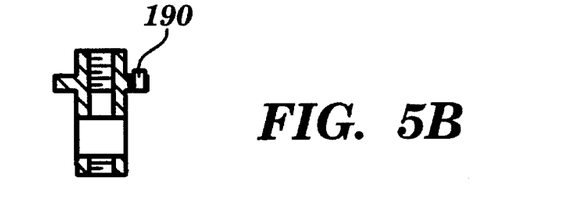
Figure 6:
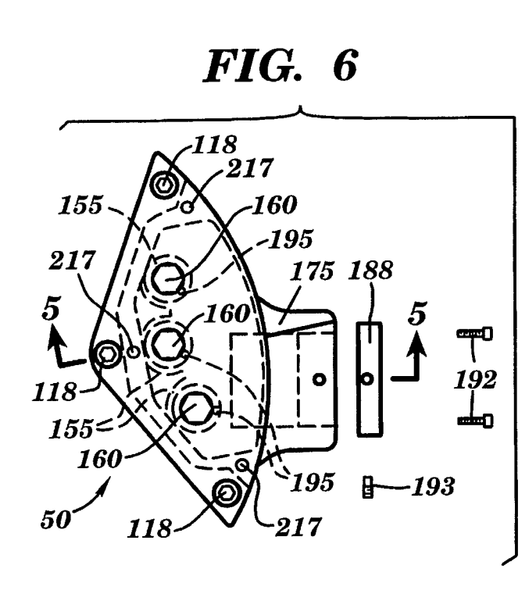
FIG. 6 is a top plan view, partially in phantom, of the second high power electrical interface unit of FIGS. 5A and 5B.

The high power interface unit of the tooling adaptor will now be described. Referring back to FIG. 1, tooling adaptor 35 is shown removably attached to tooling adaptor plate 40, and thereby to spot welding gun 45. Second high power electrical interface unit 50 is removably attached to robot adaptor 35, and is shown in detail in FIGS. 5–7. Second interface unit 50 has a housing 175 of a similar construction to housing 55 of the first interface unit 30. Housing 175 contains a plurality of second high power electrical connectors 155. In FIG. 6, three electrical connectors 155 are shown.

Second electrical connector 155 is preferably made of the same highly conductive material as first electrical connector 60. Attached to and corresponding to each second electrical connector 155 is a second replaceable high power electrical contact 160. Ultimately, three second high power contacts 160 of tooling adaptor 35 will mate with first high power contacts 105 of robot adaptor 15.

Second electrical connector 155 is cylindrically shaped, and has an exterior, concentric cylindrical wing 170 integrally formed near one end. In order to secure electrical connector 155 to second housing 175, a cylindrical channel 180 is integrally formed in housing 175, to receive the periphery of cylindrical wing 170. After cylindrical wing 170 of electrical connector 155 is inserted into cylindrical channel 180, a snap ring 185 is placed around the body of connector 155, and into a concentric groove 182 of cylindrical channel 180. Snap ring 182 expands outwardly in groove 182 to fasten second electrical connector 155 securely within channel 180 of housing 175. In order to prevent rotation of second connector 155, a dowel pin 190 is attached to cylindrical wing 170 and passes through an orifice 195 integrally formed in the top wall of channel 180 of housing 175. Preferably, dowel pin 190 is attached and extends through a hole 173 of cylindrical wing 170. The placement of dowel pin 190 into orifice 195 prevents both clockwise and counterclockwise rotation of second electrical connector 155.

In the preferred embodiment, second electrical connector 155 has a vertical bore 165 passing axially therethrough. Both end portions of the inner wall of vertical bore 165 are threaded. The threaded top end portion 166 of vertical bore 165 is threaded to receive threaded stem 111 of a second replaceable high power electrical contact 160. The threaded bottom end portion 167 of vertical bore 165 is threaded to receive a set screw 90 for securing cable wire 205 within a side-opening passage 200 of connector 155.

While first electrical contact 105 is preferably recessed in opening 125 of first housing 55, second replaceable high power electrical contact 160 extends through and beyond its associated opening 128 in second housing 175. Second housing 175 includes a contact face 177 for opening 128. Such a configuration permits recessed first contact 105 to unite with hyper-extending second contact 160. Generally, in its non-operating position, contact surface 116 of second electrical contact 160 of tooling adaptor 35 faces substantially upward, as shown in FIG. 1. Hyper-extension of second electrical contact 160, therefore prevents the buildup of contamination and waste, which would more likely occur if second contact 160 was recessed in opening 128. There is no safety concern with hyper-extending second contact 160, since the transfer of current through second contact 160 only occurs when first contact 105 mates with second contact 160.

Preferably, second replaceable high power electrical contact 160 is structurally and materially identical to first replaceable high power electrical contact 105. Structural conformity provides uniformity and simplicity in removing and replacing damaged high power electrical contacts. Therefore, the use of identical contacts is preferred. Like first electrical contact 105, second electrical contact 160 has head portion 115, having a contact surface 116. Head portion 115 has a side surface 118, which is multi-faceted, so that head portion 115, in cross-section, has a hexagonal configuration, adaptable for engagement by a common hand tool, such as a socket wrench. Contact 160 is thus replaceable through housing opening 128 without any other disassembly of interface unit 50.

Figure 9:
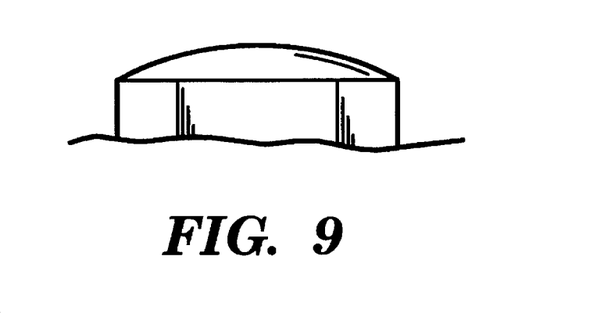
FIG. 9 is a blown up side view depicting one embodiment of the high power electrical contact.
Figure 10:
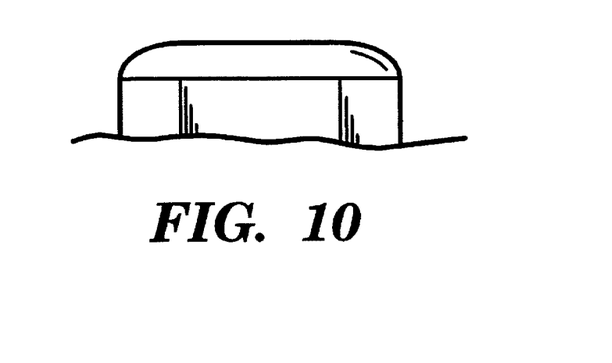
FIG. 10 is a blown up side view depicting another embodiment of the high power electrical contact.

Contact surface 116 of contact 160 has a spherical or spheroidal shape. The spherical or spheroidal shape provides a reliable electrical contact surface for mating first high power electrical contact 105 and second high power electrical contact 160. Since perfect alignment between robot adaptor 15 and tooling adaptor 35 is difficult to attain, the spherical or spheroidal shape makes up for any misalignment of first contact 105 and second contact 160. As stated earlier, first electrical connector 60 and attached first contact 105 are spring loaded, which also provides a finer and more secure junction for the contact surfaces of first replaceable high power contact 105 and second replaceable high power contact 160 when they mate.

A side opening passage 200 is formed in second electrical connector 155 for a second cable wire 205 to be removably attached to electrical connector 155. Once cable wire 205 is inserted into passage 200, set screw 90 may be threaded to the threaded bottom portion 167 of vertical bore 165 to engage and secure wire 205 in passage 200. After connection of cable wires 205 to respective connectors 155, a cover 215 is mechanically fastened to housing 175, preferably by screws 217.

In the preferred embodiment, first high power electrical interface unit 30 contains three pre-positioned first high power electrical contacts 105, which are threadably fastened to corresponding first electrical connectors 60. Each first electrical connector 60 is attached to a corresponding cable wire 80A, 80B, or 80C namely a ground wire, or one of two current carrying wires. Cable assembly 85 housing cable wires 80 is mechanically attached to first interface unit 30 by an adaptor 88 in conjunction with various screws 92 and set screws 93. The other end of cable assembly 85 is connected to a power source (not shown).

Figure 7:
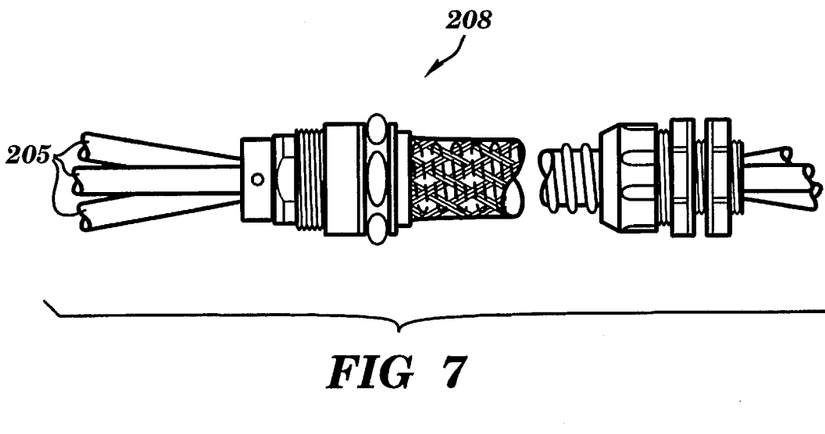
FIG. 7 is a side view of a second high power cable and accompanying second cable assembly for the second high power electrical interface unit of FIGS. 6 and 7.
Figure 8:
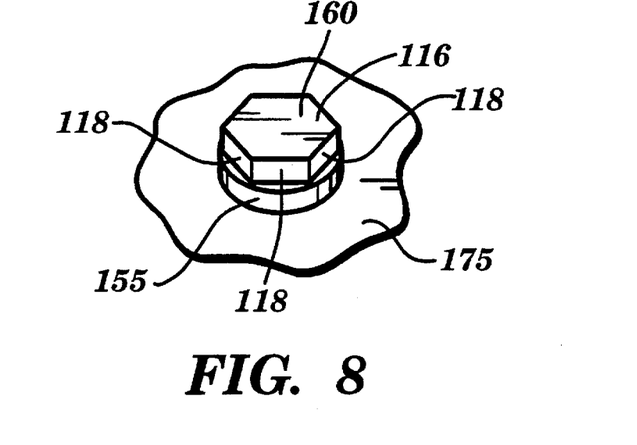
FIG. 8 is a blown up view of a portion of the second high power electrical interface unit of FIGS. 5A and 5B.

Like first interface unit 30, second high power electrical interface unit 50 contains three pre-positioned second high power electrical contacts 160, which are threadably fastened to corresponding second electrical connectors 155. Each second electrical connector 155 is attached to a corresponding cable wire 205, namely a ground wire, or one of two current carrying wires. Cable wires 205 are preferably housed in a second cable assembly 208. Assembly 208 is mechanically attached to second interface unit 50 by fastener 188, in conjunction with various screws 192 and set screws 193. The remote end of cable assembly 208 and cable wires 205 therein are connected to spot welding gun 45.

In operation, robot adaptor 15 mechanically mates with tooling adaptor 35 and triple-cam latching mechanism 52 engages. When latching mechanism 52 secures tooling adaptor 35 to robot adaptor 15, a high power electrical junction is made between first electrical contacts 105 and corresponding second electrical contacts 160. The spherical or spheroidal contact surface of both first and second contacts, along with the spring loading of first contacts 105 ensures a good contact between the corresponding first and second high power contacts.

Once the high power junction between the first and second contacts is made, the system may be energized for operation of spot welding gun 45. In this regard, current flows from the power source (not shown), through wires 80 contained in assembly 85 to first connectors 60 and first contacts 105. The current then passes from first contacts 105 to and through second contacts 160 and second connectors 155 to cable wires 205, ultimately energizing spot welding gun 45.

Once a high power electrical contact becomes damaged as a result of contamination, a mechanic can simply use a common hand tool, such as a socket wrench, to replace the damaged replaceable high power electrical contact through its associated housing opening. Such replacement requires no other disassembly of the robotic tool changing system 10, and only a common hand tool is necessary.

While a preferred embodiment of the present invention has been described and depicted herein, alternative constructions may be effected by those skilled in the art to accomplish the same objectives. For example, the replaceable high power electrical contact of the present invention does not require a threaded stem for attachment to its corresponding high power electrical connector. Any mechanical, chemical, or other means of connection is suitable so long as the connection permits replacement without adaptor or system disassembly. One such example may include the use of an expansion pin. Similarly, the number, location, construction and configuration of the parts of the interface unit may vary. Accordingly, it is intended by the appended claims to cover all such alternative aspects as fall within the true spirit and scope of the invention.

What is claimed:

1. In a robotic tool changing system, a high power electrical interface unit, comprising:

a housing;

a high power electrical connector housed within said housing for connection to a high power cable;

a replaceable high power electrical contact removably attachable to said electrical connector; and said contact being accessible at an opening in a contact face of said housing and replaceable without requiring replacement of said connector, wherein said connector is part of one of a robot adaptor or a tooling adaptor to allow power to be supplied to said tooling adapter at said contact face when said robot adaptor and said tooling adaptor are mated.

2. The robotic tool changing system of claim 1, wherein said replaceable high power electrical contact is replaceable at said opening from outside of said contact face.

3. The robotic tool changing system of claim 1, wherein said contact is threadably attachable to said connector.

4. The robotic tool changing system of claim 3, wherein said replaceable high power electrical contact comprises a threaded stem and said electrical connector comprises a threaded aperture for threadably receiving said threaded stem of said electrical contact.

5. The robotic tool changing system of claim 1, wherein said replaceable high power electrical contact is recessed into said opening of said housing.

6. The robotic tool changing system of claim 1, wherein said replaceable high power electrical contact extends beyond said opening of said housing.

7. The robotic tool changing system of claim 4, wherein said replaceable high power electrical contact further comprises a head portion at an end of said threaded stem, said head portion having a contact surface and a side surface extending from said contact surface towards said threaded stem.

8. The robotic tool changing system of claim 7, wherein said contact surface has a spherical shape.

9. The robotic tool changing system of claim 7, wherein said contact surface has a spheroidal shape.

10. The robotic tool changing system of claim 7, wherein the side surface of said head portion is configured to be engaged by a hand tool so that said high power electrical contact is easily attachable to and removable from said electrical connector with said hand tool.

11. The robotic tool changing system of claim 10, wherein said head portion has an hexagonal configuration.

12. The robotic tool changing system of claim 4, further comprising means for preventing said high power electrical connector from rotating within said housing when said replaceable high power electrical contact is threaded to said high power electrical connector.

13. The robotic tool changing system of claim 12, wherein said means for preventing said electrical connector from rotating comprises a member secured to said housing and positioned such that when said electrical connector abuts against said member, said electrical connector is prevented from rotating.

14. The robotic tool changing system of claim 13, wherein said member comprises an integrally formed wall of said housing.

15. The robotic tool changing system of claim 13, wherein said member comprises an elongated pin attached to said housing.

16. The robotic tool changing system of claim 13, wherein said member comprises a plate having a substantially rectangular body.

17. The robotic tool changing system of claim 12, wherein said means for preventing said connector from rotating comprises a dowel attached to said connector and an orifice in said housing for receiving said dowel, wherein when said dowel abuts against a wall of said orifice, said connector is prevented from rotating.

18. The robotic tool changing system of claim 1, wherein said housing comprises electrically insulating material.

19. The robotic tool changing system of claim 1, further comprising:

a plurality of high power electrical connectors housed within said housing, and a plurality of replaceable high power electrical contacts, each of said plurality of contacts being removably attachable to a corresponding one of said plurality of electrical connectors and extending into a respective opening in said housing.

20. The robotic tool changing system of claim 1 wherein the interface unit is denominated as a first interface unit, further in combination with a second interface unit for making a high power electrically conducting junction between said first and second interface units.

21. The combination of claim 20 wherein said second interface unit comprises:

a second housing;

a second high power electrical connector housed within said second housing for connection to a second high power cable; and a second replaceable high power electrical contact removably attachable to said second electrical connector, said second replaceable high power electrical contact extending into an opening in said second housing and being replaceable through said second housing opening without other disassembly of the second interface unit.

22. The robotic tool changing system of claim 1, wherein said robotic tool changing system comprises a robot adaptor and a tooling adaptor, and said interface unit comprises a removable module of one of said robot adaptor and said tooling adaptor.

* * * * *